US012668154B2

(12) United States Patent
Heeg et al.

(10) Patent No.:  US 12,668,154 B2
(45) Date of Patent:      Jun. 30, 2026

(54) IDENTIFICATION OF THE INSTALLATION POSITION OF A SEAT IN A VEHICLE

(71) Applicant: Adient US LLC, Plymouth, MI (US)

(72) Inventors: Norbert Heeg, Dahn (DE); Mark Thomas Prosch, Solingen (DE)

(73) Assignee: Adient US LLC, Plymouth, MI (US)

( * ) Notice:   Subject to any disclaimer, the term of this patent is extended or adjusted under 35 U.S.C. 154(b) by 38 days.

(21) Appl. No.:   18/716,315

(22) PCT Filed:   Dec. 7, 2022

(86) PCT No.:   PCT/IB2022/061863
§ 371 (c)(1),
(2) Date:   Jun. 4, 2024

(87) PCT Pub. No.:   WO2023/105425
PCT Pub. Date: Jun. 15, 2023

(65) Prior Publication Data
US 2025/0018834 A1      Jan. 16, 2025

(30) Foreign Application Priority Data

Dec. 7, 2021   (DE) ..................... 10 2021 213 928.0
Mar. 31, 2022   (DE) ..................... 10 2022 203 202.0

(51) Int. Cl.
*B60N 2/00*         (2006.01)
*B60N 2/02*         (2006.01)
(52) U.S. Cl.
CPC ......... *B60N 2/0025* (2023.08); *B60N 2/0272* (2023.08); *B60N 2210/16* (2023.08)
(58) Field of Classification Search
CPC   B60N 2/0025; B60N 2/0272; B60N 2210/16; B60N 2/0264
See application file for complete search history.

(56) References Cited

U.S. PATENT DOCUMENTS

2007/0102999 A1* 5/2007 Darraba ................. G01D 5/204
                                                                307/10.1
2008/0312795 A1* 12/2008 Cho .................. B60R 21/01516
                                                                701/45

(Continued)

FOREIGN PATENT DOCUMENTS

DE      102008052250 A1     4/2010
DE      102012013688 A1     1/2014

(Continued)

OTHER PUBLICATIONS

Machine translation of DE 202014007799 U1 downloaded from IP.com Sep. 4, 2025 (Year: 2025).*

(Continued)

*Primary Examiner* — Kito R Robinson
*Assistant Examiner* — Tanya C Sienko
(74) *Attorney, Agent, or Firm* — Marshall & Melhorn, LLC

(57)                  ABSTRACT

A vehicle seat for variable installation in different installation positions in a vehicle interior of a vehicle is provided. The vehicle seat may have an electronic seat control unit which is designed, following or during installation of the vehicle seat in one of the installation positions in the vehicle, to determine at least the assumed installation position of the vehicle seat via a resistance measurement and/or a contactless measurement by means of an RFID sensor or an NFC sensor. A vehicle having at least one vehicle seat, which can be installed variably in different installation positions in the vehicle interior, and to a method for identifying an installation position of a vehicle seat in a vehicle, are also provided.

18 Claims, 2 Drawing Sheets

(56)                    References Cited

U.S. PATENT DOCUMENTS

| | | | | |
|---|---|---|---|---|
| 2018/0222349 A1 * | 8/2018 | Esslinger | ................. | B60N 2/06 |
| 2020/0189498 A1 * | 6/2020 | Line | ..................... | B60R 16/027 |
| 2022/0266722 A1 * | 8/2022 | Bauernfeind | ........... | B60N 2/01 |

FOREIGN PATENT DOCUMENTS

| | | | | |
|---|---|---|---|---|
| DE | 102012016932 A1 | 2/2014 | | |
| DE | 102013216549 B3 | 8/2014 | | |
| DE | 102013221986 A1 | 4/2015 | | |
| DE | 102014208383 A1 | 11/2015 | | |
| DE | 202014007799 U1 * | 1/2016 | ....... | B60R 21/01546 |
| DE | 112016002538 T5 | 2/2018 | | |
| DE | 102018208166 A1 | 11/2019 | | |
| DE | 102019215985 A1 | 4/2021 | | |
| GB | 2498199 A * | 7/2013 | .............. | B60N 2/22 |
| WO | 2009108796 A2 | 9/2009 | | |
| WO | 2021013730 A2 | 1/2021 | | |

OTHER PUBLICATIONS

European Patent Office, International Search Report and Written Opinion in Application No. PCT/IB2022/061863, dated Feb. 16, 2023, 14 pages, Rijswijk, Netherlands.

\* cited by examiner

IDENTIFICATION OF THE INSTALLATION POSITION OF A SEAT IN A VEHICLE

FIELD

The invention relates to a method for identifying an installation position of a vehicle seat in a vehicle and to a vehicle having a vehicle seat that is releasably securable in the vehicle.

BACKGROUND

Adjustable vehicle seats and vehicle seats that are releasably securable in a vehicle are known from the prior art.

A seat longitudinal adjustment device for at least one vehicle seat in a vehicle generally comprises two pairs of rails which are arranged at a distance from one another and are each constructed of two rails, an upper rail associated with the seat and a lower rail associated with the floor of the vehicle. The seat longitudinal adjustment device is electrically adjustable, for example. To arrange the vehicle seat releasably in a vehicle, it is generally known to provide a locking arrangement, for example a pawl.

The object of the present invention is to specify a method for identifying an installation position of a vehicle seat in a vehicle, a method for installing a vehicle seat at one of a plurality of positions and an improved vehicle seat which can be fitted easily.

The object is achieved according to the invention with a method for identifying an installation position of a vehicle seat in a vehicle, wherein a removable vehicle seat is installable at various positions in the vehicle and wherein, when the vehicle seat is being installed, the adopted installation position of the vehicle seat in the vehicle is determined via a resistance at an installation position or at a seat position.

The object can moreover be achieved according to the invention with a method for installing a removable vehicle seat at various positions in the vehicle, wherein, when the vehicle seat is being installed, the adopted installation position of the vehicle seat in the vehicle is determined via a resistance at an installation position or at a seat position.

Alternatively, instead of a resistance, the adopted installation position of the vehicle seat in the vehicle can be determined via an RFID sensor at the seat position in the vehicle.

A further alternative envisions that the adopted installation position of the vehicle seat in the vehicle is determined via an NFC sensor at the seat position in the vehicle.

SUMMARY

With regard to the vehicle having a vehicle interior and at least one vehicle seat that is variably installable at various positions in the vehicle interior, the object is achieved according to the invention by an electronic seat control unit of the vehicle seat, wherein the electronic seat control unit is designed, following installation of the vehicle seat at one of the positions in the vehicle, to determine and optionally to output at least the adopted installation position of the vehicle seat by means of a resistance measurement and/or a contactless measurement by means of an RFID sensor or an NFC sensor. In addition, the electronic seat control unit can be designed to determine the installation direction of the vehicle seat.

A vehicle seat according to the invention for variable installation at different installation positions in a vehicle interior of a vehicle has an electronic seat control unit which is designed, following or during an installation of the vehicle seat at one of the installation positions in the vehicle, to determine at least the adopted installation position of the vehicle seat by means of a resistance measurement and/or a contactless measurement by means of an RFID sensor or an NFC sensor.

In one embodiment, seat-specific information is exchangeable by means of the RFID sensor and/or the NFC sensor.

In one embodiment, the electronic seat control unit is further designed to output the adopted installation position.

In one embodiment, the electronic seat control unit is further designed to determine the installation direction of the vehicle seat and/or to determine whether the vehicle seat is being used, for example via a weight measurement device, and/or whether a safety belt is being used, for example by means of a contact closure measurement.

According to one aspect of the present invention, a vehicle having a vehicle interior and at least one vehicle seat, as described above, which is variably installable at various installation positions in the vehicle interior is proposed.

In one embodiment, the vehicle further comprises at least one seat longitudinal adjustment device, comprising at least one pair of rails made up of an upper rail and a lower rail, which are movable relative to one another, wherein the electronic seat control unit further comprises a resistance measurement device by means of which at least one resistance, which is arranged in the upper rail, is measurable.

In a further embodiment, an RFID sensor and/or an NFC sensor is arranged on the vehicle seat or in the vehicle, in particular in the region of a seat longitudinal adjustment device, which sensor is in each case couplable to the seat control unit at least for signaling purposes, wherein the RFID sensor and/or NFC sensor is configured, when the vehicle seat is being installed at one of the installation positions in the vehicle interior, to identify the adopted installation position, to generate an identification signal about the adopted installation position and to forward this to the seat control unit. For this purpose, in each case an RFID transponder and/or an NFC transponder and/or an NFC transmitter can be arranged at the installation positions, which transponder and/or transmitter clearly indicates this installation position. It can be envisioned that the RFID sensor and/or the NFC sensor, that is to say an active component, is arranged on the vehicle seat, while RFID transponders (also called RFID tags) and/or NFC transponders (also called NFC tags) and/or NFC transmitters, that is to say passive components, are arranged at the installation positions in the vehicle. Alternatively, it can be envisioned that RFID sensors and/or NFC sensors, that is to say active components, are arranged at the installation positions in the vehicle, while the RFID transponder and/or NFC transponder and/or NFC transmitter, that is to say the passive component, is arranged on the vehicle seat.

In one embodiment, in each case one or at least one resistance that is detectable by the resistance measurement device is arranged at each installation position, wherein each of the resistances differs from each of the other resistances in terms of its resistance value, so that this installation position is clearly indicated.

In one embodiment, at each installation position an electric contact element, in particular a plug or a socket, for contacting a corresponding electric contact element, in particular a socket or a plug, is provided on the vehicle seat in order to provide a power supply for the seat control unit, wherein the resistance is arranged in the electric contact element of the installation position.

According to one aspect of the present invention, a method for identifying an installation position of a vehicle seat in a vehicle is proposed, wherein a removable vehicle seat is installable at various installation positions in the vehicle and wherein, when the vehicle seat is being installed, the adopted installation position of the vehicle seat in the vehicle is determined via a resistance and/or via an RFID sensor and/or via an NFC sensor at the installation position or at a seat position.

The advantages achieved with the invention lie in particular in the fact that an existing component of the vehicle seat is used and thus it can be simply and robustly identified where one or more vehicle seats were or are installed in the vehicle with various installation positions.

In the vehicle interior, the vehicle comprises a plurality of various installation positions for one or more vehicle seats. Moreover, the vehicle can comprise, as a seat longitudinal adjustment device, at least two pairs of rails arranged parallel to one another, each with two rails which are movable relative to one another, and an electrically operable adjustment unit by means of which one of the rails is movable relative to the other rail. The electronic seat control unit is provided for activating the adjustment unit.

Each installation position for a vehicle seat is characterized by two pairs of rails which are arranged parallel to and at a distance from one another, wherein each pair of rails comprises a fixed lower rail and an upper rail (also called a runner or running rail) that is movable in relation to the lower rail. The respective vehicle seat is secured to the upper rail and is thus arranged movably relative to the fixed lower rail in the vehicle.

Depending on the design of the seat longitudinal adjustment device, alternatively the upper rail can be formed in a fixed manner and the lower rail can be formed as the previously movable rail element. In this case, the upper rail, also called the running rail, has a significantly shorter length than the lower rail, also called the guide rail. For example the, in particular fixed, lower rail has a length of a few meters, in particular from 1.5 m to 2.5 m, for example 2 m. The upper rail or the running rail has a short length of less than 1 m.

The electronic seat control unit (also called ECU for short) of each seat is designed, for example, to determine the installation position of the respective vehicle seat by means of a resistance measurement and/or a contactless measurement by means of an RFID sensor or an NFC sensor.

In one possible embodiment, the electronic seat control unit comprises a resistance measurement device by means of which a resistance, which is arranged in the upper rail, is measurable.

Alternatively, an RFID sensor or an NFC sensor can be arranged on the vehicle seat that is to be installed, which sensor is in each case couplable to the seat control unit at least for signaling purposes. The RFID sensor identifies the adopted installation position when the vehicle seat is being installed at one of the positions in the vehicle interior. The NFC sensor 20) identifies the adopted installation position when the vehicle seat is being installed at one of the positions in the vehicle interior. The respective sensor generates an identification signal about the adopted installation position and forwards this to the seat control unit. As an alternative to the arrangement of the RFID sensor or NFC sensor on the vehicle seat, the respective sensor can also be arranged in the vehicle, in particular in the region of a seat longitudinal adjustment device and can be coupled to the seat control unit.

Each installation position is characterized by different resistances. For example, each installation position has a plug or a socket which is used for supplying power to the vehicle seat, in particular the electronic seat control unit. The vehicle seat has a socket or a plug. During the fitting process, the plug and the socket of the vehicle seat and upper rail are connected to one another, so that the electronic seat control unit is connected to a power supply, in particular to a battery, in the vehicle.

In one simple embodiment, a resistance is arranged in the plug or the socket. Each plug or each socket here has a resistance value that represents the respective installation position.

After the fitting of the vehicle seat in the vehicle, during which the plug is electrically connected to the socket, the electronic seat control unit can measure the resistance of the relevant installation position of the vehicle seat by means of the resistance measurement device.

Since each installation position has a different resistance that represents the respective installation position, the electronic seat control unit can determine the installation position of the vehicle seat in the vehicle.

The electronic seat control unit can then generate a message regarding which installation position the vehicle seat is fitted at. Moreover, the electronic seat control unit can be designed to determine whether the vehicle seat is being used, for example via a weight measurement device and/or whether a safety belt is being used, for example by means of a contact closure measurement.

Via the socket-plug connection, the electronic seat control unit of the respective vehicle seat can additionally exchange electronic signals with a central unit and/or an output unit, for example a display unit in a dashboard and/or can transfer recorded measurement data and information and/or messages derived therefrom, such as for example the installation position of the vehicle seat, the occupied vehicle seat, or the fastened safety belt, to the central unit or output unit.

DESCRIPTION OF THE FIGURES

Exemplary embodiments of the invention will now be explained in more detail with reference to the drawings, in which.

DETAILED DESCRIPTION

Mutually corresponding parts are provided with identical reference signs in both figures.

Figure 1:
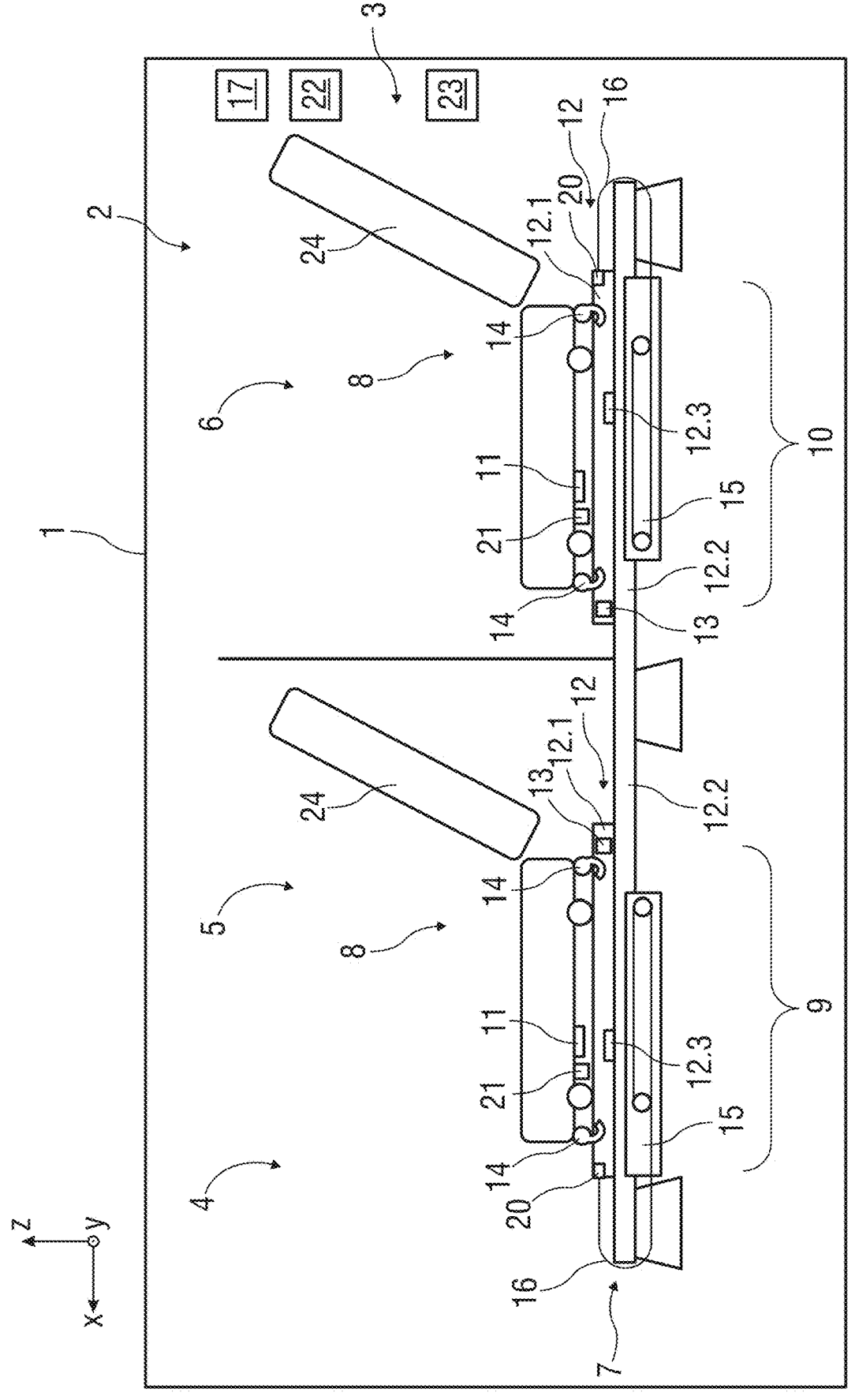
FIG. 1 shows a schematic side view of a vehicle having a vehicle interior and a seat arrangement with a plurality of rows of seats arranged behind one another, and at least one seat longitudinal adjustment device that comprises at least one lower rail and two upper rails.

FIG. 1 shows a schematic side view of a vehicle 1 having a vehicle interior 2 and a seat arrangement 3 with at least two or three seat rows 4 to 6 arranged behind one another and at least one seat longitudinal adjustment device 7, in particular for the seat rows 5 and 6. The seat rows 4 to 6 have one or more vehicle seats 8. Two vehicle seats 8 are depicted in FIG. 1.

Alternatively, the vehicle 1 can have only one seat row 4, 5 or 6 with a plurality of vehicle seats 8.

Two vehicle seats 8 are depicted, which are each arranged in the vehicle 1 in such a way as to be longitudinally displaceable by means of the seat longitudinal adjustment device 7.

The vehicle seats 8 depicted schematically in FIG. 1 will be described hereinafter using three spatial directions that run perpendicular to one another. In the case of a vehicle seat 8 installed in the vehicle 1, a longitudinal direction X runs substantially horizontally and preferably parallel to a vehicle longitudinal direction that corresponds to the regular direction of travel of the vehicle 1. A transverse direction Y that runs perpendicular to the longitudinal direction X is also oriented horizontally in the vehicle 1 and runs parallel to a vehicle transverse direction. A vertical direction Z runs perpendicular to the longitudinal direction X and perpendicular to the transverse direction Y. In the case of a vehicle seat 8 installed in the vehicle 1, the vertical direction Z preferably runs parallel to a vehicle vertical axis.

The position details and direction details used, such as front, rear, upper and lower for example, relate to a viewing direction of an occupant sitting in a normal sitting position in the vehicle seat 8, wherein the vehicle seat 8 is installed in the vehicle 1, in a position of use suitable for conveying passengers, with upright back rests 24, and is oriented as usual in the direction of travel. The vehicle seat 8 can, however, also be mounted or moved in a different orientation, for example transversely to the direction of travel.

The vehicle seats 8 are variably installable in the vehicle interior 2. For this purpose, the vehicle interior 2 has various installation positions 9, 10.

The respective vehicle seat 8 comprises an associated electronic seat control unit 11. The electronic seat control unit 11 of the respective vehicle seat 8 is designed, after the vehicle seat 8 has been installed at one of the various positions in the vehicle 1, to determine and optionally to output at least the adopted installation position 9, 10, 18, 19 (depicted in FIG. 2) of the relevant vehicle seat 8 by means of a resistance measurement, a contactless measurement by means of an RFID sensor or a contactless measurement by means of an NFC sensor.

It is envisioned in particular that, when the vehicle seat 8 is being installed in the vehicle 1, the adopted installation position 9, 10, 18 or 19 of the vehicle seat 8 in the vehicle 1 is determined via a resistance at the respective installation position 9, 10, 18 and 19 or at a seat position.

Alternatively, instead of a resistance, the adopted installation position 9, 10, 18 or 19 of the vehicle seat 8 in the vehicle 1 can be determined via an RFID sensor at the seat position in the vehicle 1.

A further alternative envisions that the adopted installation position 9, 10, 18 or 19 of the vehicle seat 8 in the vehicle 1 is determined via an NFC sensor at the seat position in the vehicle 1.

The associated electronic seat control unit 11 is provided in particular for controlling an adjustment of the respective vehicle seat 8 in the vehicle 1.

The electronic seat control unit 11 of the respective vehicle seat 8 is designed, after the associated vehicle seat 8 has been fitted at one of the installation positions 9 or 10 in the vehicle 1, to determine and optionally to output at least this installation position 9 or 10 of the installed vehicle seat 8. In addition, the electronic seat control unit 11 can be designed to determine the installation direction of the respective vehicle seat 8.

The seat longitudinal adjustment device 7 comprises at least one pair of rails 12, each with two rails 12.1, 12.2 which are movable relative to one another, and optionally an electrically operable adjustment unit 13 by means of which one of the rails 12.1, also called upper rail 12.1, is movable relative to the other rail 12.2, also called lower rail 12.2. The electronic seat control unit 11 is provided for activating the adjustment unit 13. To lock the seat longitudinal adjustment device 7, a releasable locking element 12.3 is provided, which locks the upper rail 12.1 and the lower rail 12.2 against undesired adjustment in the longitudinal direction X. In order to adjust the vehicle seat 8 along the longitudinal direction X in the vehicle 1, the locking element 12.3 is unlockable, so that the upper rail 12.1, and thus the vehicle seat 8 secured thereon, can be adjusted.

Figure 2:
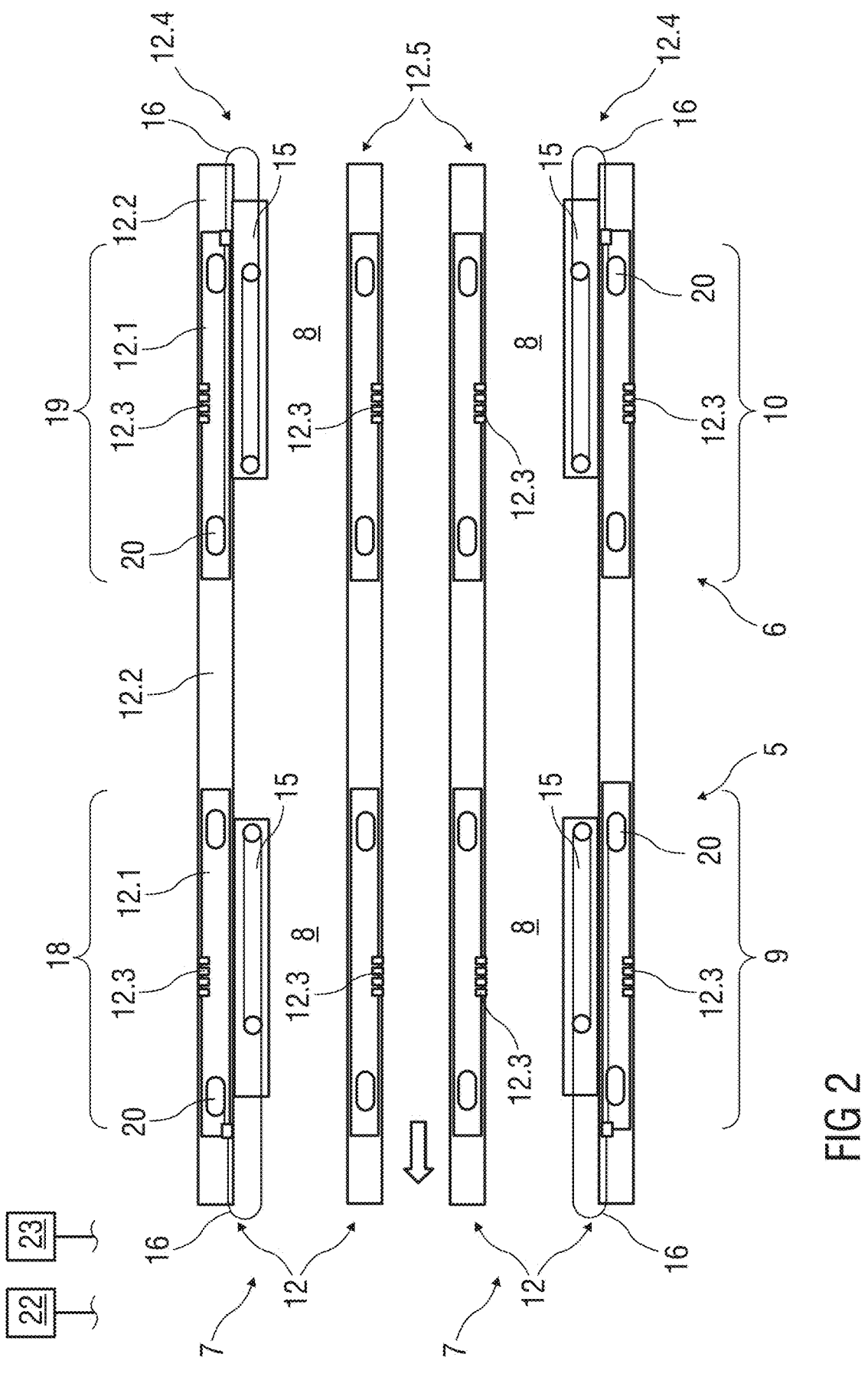
FIG. 2 shows a schematic plan view of a number of components of a seat longitudinal adjustment device.

Each installation position 9, 10 for the vehicle seats 8 is characterized by two pairs of rails 12, which are arranged parallel to and at a distance from one another, as depicted in FIG. 2.

Each pair of rails 12 has a fixed lower rail 12.2 and an upper rail 12.1 (also called runner or running rail) that is movable in relation to the lower rail 12.2. The respective vehicle seat 8 is secured to the upper rail 12.1 in a conventional manner, for example by means of securing elements 14, in particular securing clamps, and thus arranged in the vehicle 1 so as to be movable relative to the fixed lower rail 12.2.

In the depicted exemplary embodiment, the pairs of rails 12 comprise vehicle seats 8 arranged behind one another, a common lower rail 12.2 and two upper rails 12.1, wherein the upper rails 12.1 are each associated with one of the vehicle seats 8. The lower rail 12.2 is designed as a longtrack, for example.

The upper rails 12.1 are each arranged between a front end position and a rear end position in a longitudinally adjustable manner on the lower rail 12.2. This adjustability allows a longitudinal adjustment of the position of the respective vehicle seat 8.

Depending on the design of the seat longitudinal adjustment device 7, alternatively the upper rail 12.1 can be formed in a fixed manner and the lower rail 12.2 can be formed as the previously movable rail element. Here, the upper rail 12.1, also called the running rail, has a substantially shorter length than the lower rail 12.2, also called the guide rail. For example the, in particular fixed, lower rail 12.2 has a length of a few meters, in particular from 1.5 m to 2.5 m, for example 2 m. The upper rail 12.1 or the running rail has a short length of less than 1 m.

The seat longitudinal adjustment device 7 is electric. To supply electric power to the electronic seat control unit 11 and to the electric adjustment unit 13, in particular to an electric motor, for example a spindle motor, a cable deflection device 15 for a connecting cable 16 is provided. This cable deflection device 15 can be configured to allow the connecting cable 16 to be pulled out, for example by a pull-out length of more than 1300 mm.

The connecting cable 16 connects the adjustment unit 13 and the electronic seat control unit 11 to a power source 17, for example a vehicle onboard electrical system or a battery.

The connecting cable 16 is arranged, in particular held in a guided manner, partially in the cable deflection device 15 and partially in a rail profile, in particular in the upper rail 12.1, of the respective pair of rails 12.

FIG. 2 schematically shows a plan view of the components of the seat longitudinal adjustment device 7 for four vehicle seats 8 with four different installation positions 9, 10 and 18, 19.

In FIG. 2, two seat longitudinal adjustment devices 7 and four pairs of rails 12 are depicted, wherein in each case one seat longitudinal adjustment device 7 comprises two pairs of rails 12 which are at a distance from one another. For example, the respective seat longitudinal adjustment device 7 comprises an outer pair of rails 12.4 and an inner pair of rails 12.5. In the depicted exemplary embodiment, in each case the outer pair of rails 12.4 comprises the cable deflection device 15. The respective cable deflection device 15 is arranged on an inner side of the outer pair of rails 12.4. The respective cable deflection device 15 is accordingly arranged between two pairs of rails 12 of a seat longitudinal adjustment device 7. The respective lower rail 12.2 is continuous for both seat rows 5, 6.

The electronic seat control unit 11 (also called ECU for short) of each vehicle seat 8 is designed, for example, to determine the installation position 9, 10, 18 or 19 of the respective vehicle seat 8 by means of a resistance measurement. In addition or as an alternative, the electronic seat control unit 11 can be coupled to an RFID sensor or an NFC sensor to identify the adopted installation position 9, 10, 18 or 19 of the vehicle seat 8.

In one possible embodiment, the electronic seat control unit 11 comprises a resistance measurement device by means of which a resistance, which is arranged in the upper rail 12.1 of the respective installation position 9, 10, 18, 19, is measurable.

Each installation position 9, 10, 18, 19 is characterized by different resistances. For example, each installation position 9, 10, 18, 19 has an electric contact element 20, in particular a plug or a socket, on the upper rail 12.1 and a corresponding electric contact element 21, in particular a socket or a plug, on the associated vehicle seat 8. The electric contact elements 20, 21 are used in the plugged state for supplying power to the respective vehicle seat 8, in particular the associated electronic seat control unit 11 and the adjustment unit 13, at the respective installation position 9, 10, 18, 19.

During the fitting process, the electric contact elements 20, 21, the plug and the socket, of the vehicle seat 8 and upper rail 12.1 are connected to one another, so that the electronic seat control unit 11 is connected to the power source 17, in particular to a battery or to the onboard electrical system, in the vehicle 1.

In one simple embodiment, a resistance is arranged in the electric contact element 20, in particular the plug or the socket, of the upper rail 12.1. Each electric contact element 20 here has a resistance value that represents the respective installation position 9, 10, 18 or 19.

After the vehicle seat 8 has been fitted in the vehicle 1, during which process the electric contact elements 20, 21 are electrically connected to one another, the electronic seat control unit 11 can measure the resistance of the relevant installation position 9, 10, 18, 19 of the associated vehicle seat 8 by means of the resistance measurement device.

Since each installation position 9, 10, 18, 19 has a different resistance that represents the respective installation position 9, 10, 18, 19, the electronic seat control unit 11 can determine the installation position 9, 10, 18, 19 of the respective vehicle seat 8 in the vehicle 1.

The electronic seat control unit 11 can then generate a message regarding which installation position 9, 10, 18, 19 the vehicle seat 8 is fitted at. Moreover, the electronic seat control unit 11 can be designed to determine whether the vehicle seat 8 is being used, for example via a weight measurement device, and/or whether a safety belt is being used, for example by means of a contact closure measurement.

Via the socket-plug connection of the electronic or electric contact elements 20, 21, the electronic seat control unit 11 of the respective vehicle seat 8 can additionally exchange electronic signals with a central unit 22 and/or an output unit 23, for example a display unit in a dashboard of the vehicle 1, and/or can transfer recorded measurement data and information and/or messages derived therefrom, such as for example the installation position 9, 10, 18, 19 of the respective vehicle seat 8, occupancy state of the vehicle seat 8, or fastening state of the safety belt of the vehicle seat 8, to the central unit 22 or output unit 23.

LIST OF REFERENCE SIGNS

1 vehicle
2 vehicle interior
3 seat arrangement
4 row of seats
5 row of seats
6 row of seats
7 seat longitudinal adjustment device
8 vehicle seat
9 installation position
10 installation position
11 electronic seat control unit
12 pair of rails
12.1 rail, upper rail
12.2 rail, lower rail
12.3 locking element
12.4 outer pair of rails
12.5 inner pair of rails
13 adjustment unit
14 securing element
15 cable deflection device
16 connecting cable
17 power source
18 installation position
19 installation position
20 electric contact element
21 electric contact element
22 central unit
23 output unit
24 back rest
X longitudinal direction
Y transverse direction
Z vertical direction

The invention claimed is:

1. A vehicle seat for variable installation at different installation positions in a vehicle interior of a vehicle, comprising: an electronic seat control unit which is designed, following or during an installation of the vehicle seat at one of the installation positions in the vehicle, to determine at least the adopted installation position of the vehicle seat via a resistance measurement and/or a contactless measurement by means of a Radio Frequency Identification (RFID) sensor or a Near-Field Communications (NFC) sensor, wherein, at each installation position an electric contact element, including a plug or a socket, for contacting a corresponding electric contact element, including a socket or a plug, is provided on the vehicle seat in order to provide a power supply for the seat control unit, wherein a resistance is arranged in the electric contact element of the installation position.

2. The vehicle seat as claimed in claim 1, wherein seat-specific information is exchangeable via the RFID sensor and/or the NFC sensor.

3. The vehicle seat as claimed in claim 1, wherein the electronic seat control unit is further designed to output the adopted installation position.

4. The vehicle seat as claimed in claim 1, wherein the electronic seat control unit is further designed to determine an installation direction of the vehicle seat and/or to determine whether the vehicle seat is being used and/or whether a safety belt is being used.

5. The vehicle seat as claimed in claim 4, wherein the electronic seat control unit is designed to determine, by a weight measurement, whether the vehicle seat is being used.

6. The vehicle seat as claimed in claim 4, wherein the electronic seat control unit is designed to determine, via a contact closure measurement, whether the safety belt is being used.

7. A vehicle having a vehicle interior and the vehicle seat, as claimed in claim 1, which is variably installable at various installation positions in the vehicle interior.

8. The vehicle as claimed in claim 7, further comprising at least one seat longitudinal adjustment device, comprising at least one pair of rails made up of an upper rail and a lower rail, which are movable relative to one another, wherein the electronic seat control unit further comprises a resistance measurement device by means of which at least one resistance, which is arranged in the upper rail, is measurable.

9. The vehicle as claimed in claim 7, wherein an RFID sensor and/or an NFC sensor is arranged on the vehicle seat or in the vehicle, including in a region of a seat longitudinal adjustment device, which sensor is in each case couplable to the seat control unit at least for signalling purposes, wherein the RFID sensor and/or NFC sensor is configured, when the vehicle seat is being installed at one of the installation positions in the vehicle interior, to identify the adopted installation position, to generate an identification signal about the adopted installation position and to forward this to the seat control unit.

10. The vehicle as claimed in claim 9, wherein the RFID sensor and/or NFC sensor is arranged on the vehicle seat, wherein RFID transponders and/or NFC transponders and/or NFC transmitters are arranged at the installation positions in the vehicle.

11. The vehicle as claimed in claim 9, wherein RFID sensors and/or NFC sensors are arranged at the installation positions in the vehicle, wherein an RFID transponder and/or NFC transponder and/or NFC transmitter is arranged on the vehicle seat.

12. The vehicle as claimed in claim 7, wherein in each case at least one resistance that is detectable by a resistance measurement device is arranged at each installation position, wherein each of the resistances differs from each of the other resistances in terms of its resistance value.

13. The vehicle as claimed in claim 7, wherein the electronic seat control unit is designed to output the adopted installation position of the vehicle seat.

14. The vehicle as claimed in claim 1, wherein the electronic seat control unit is designed to exchange electronic signals with a central unit and/or an output unit via a connection between the socket and the plug, and/or to transfer recorded measurement data and information and/or messages derived therefrom to the central unit and/or output unit.

15. The vehicle as claimed in claim 14, wherein the output unit is formed as a display unit in a dashboard.

16. The vehicle as claimed in claim 14, wherein the information relates to the installation position of the vehicle seat, to an occupied vehicle seat and/or to a fastened safety belt.

17. A method for identifying an installation position of a vehicle seat in a vehicle, comprising:

determining an adopted installation position as one of multiple possible installation positions for an installable vehicle seat in a vehicle by using a resistance and/or by a Radio Frequency Identification (RFID) sensor and/or by a Near-Field Communications (NFC) sensor at the multiple possible installation positions, and contacting, at each installation position, an electric contact element and a corresponding electric contact element, which are either a socket or a plug, to provide a power supply for a seat control unit, wherein the resistance is in the electric contact element of the adopted installation position.

18. A method for installing a removable vehicle seat at at least one of various installation positions in a vehicle, comprising:

determining an adopted installation position as one of multiple possible installation positions for an installable vehicle seat in a vehicle by using a resistance and/or by a Radio Frequency Identification (RFID) sensor and/or by a Near-Field Communications (NFC) sensor at the multiple possible installation positions, and contacting, at each installation position, an electric contact element and a corresponding electric contact element, which are either a socket or a plug, to provide a power supply for a seat control unit, wherein the resistance is in the electric contact element of the adopted installation position, and installing the removable vehicle seat in the determined adopted installation position.

*    *    *    *    *